United States Patent [19]
Law et al.

[11] Patent Number: 5,766,688
[45] Date of Patent: Jun. 16, 1998

[54] PROCESSES INVOLVING METAL HYDRIDES

[75] Inventors: Henry Hon Law, Berkeley Heights; Brijesh Vyas, Warren, both of N.J.

[73] Assignee: Lucent Technologies Inc., Murray Hill, N.J.

[21] Appl. No.: 896,571

[22] Filed: Jul. 18, 1997

Related U.S. Application Data

[60] Continuation of Ser. No. 735,274, Oct. 16, 1996, abandoned, which is a division of Ser. No. 502,504, Jul. 14, 1995, Pat. No. 5,630,933.

[51] Int. Cl.$^6$ ................................................. B05D 1/36
[52] U.S. Cl. .................. 427/419.1; 427/436; 427/437; 427/438; 427/443.2
[58] Field of Search .......................... 427/419.1, 436, 427/437, 438, 443.2

[56] References Cited

U.S. PATENT DOCUMENTS

| | | | |
|---|---|---|---|
| 4,127,709 | 11/1978 | Ruben | 429/245 |
| 4,304,593 | 12/1981 | Maeland | 75/0.5 |
| 4,946,646 | 8/1990 | Game et al. | 420/415 |
| 5,149,420 | 9/1992 | Buxbaum et al. | 205/219 |
| 5,219,678 | 6/1993 | Hasebe et al. | 429/59 |
| 5,298,037 | 3/1994 | Murphy et al. | 29/623.1 |
| 5,560,752 | 10/1996 | Badding et al. | 29/623.1 |
| 5,591,394 | 1/1997 | Lee et al. | 420/422 |

FOREIGN PATENT DOCUMENTS

| | | |
|---|---|---|
| 0 360 203 | 3/1990 | European Pat. Off. |
| 7-262989 | 10/1995 | Japan |

OTHER PUBLICATIONS

"Electrolytic Hydriding of Zirconium", by Attermo, R. et al. *Electrochimica Acta*, vol. 14 p. 232 (Dec. 11, 1967).

"Electrocatalysis in the Nickel–Titanium System", by Justi, E. W. et al., *Energy Conversion*, 10 183 pp. 183–187 (1970).

"A New Type of Reversible Negative Electrode for Alkaline Storage Batteries Based on Metal Alloy Hydrides", by Gutjahr, M. A. et al., *Power Sources*, 4 pp. 79–91 (1973).

"Metal Hydrides: A Review of Group V Transition Metals–Niobium, Vanadium and Tantalum", by Esayed, A. Y. et al. *J. Hydrogen Energy*, vol. 17 pp. 41–52 (1992).

A. Kozawa et al., "Improvement of Cyclability of Metal–Hydride Electrodes by The Addition of Silver Compounds," *Progress In Batteries & Battery Materials*, vol. 12 (1 Jan. 1993), XP000542357, pp. 103–107.

C. Iwakura et al., Surface Modification of Metal Hydride Negative Electrodes And Their Charge/Discharge Performance, *Journal of Power Sources* vol. 38, No. 3, (May 1992), XP000324882, pp. 335–343.

*Primary Examiner*—Benjamin Utech
*Attorney, Agent, or Firm*—Bruce S. Schneider; Scott J. Rittman

[57] ABSTRACT

Metal hydrides are activated by an electrochemical procedure. In this procedure, a bulk sample of the corresponding metal is immersed in an aqueous electrolyte and contacted by a cathode. Current passed through the aqueous electrolyte causes electrolysis of the water and a concomitant reaction with the formation of metal hydride. As a result, the metal hydride is fractured and smaller particles result. Additionally, the resulting metal hydride has a substantial amount of absorbed hydrogen. A novel plating method, taking advantage of the reducing power of hydrogen absorbed in a metal hydride, is useful to encapsulate such metal hydride with a variety of metals. Therefore, such hydrides are uniformly coated by using plating solutions without the standard reducing agent and stabilizer.

5 Claims, 2 Drawing Sheets

EFFECT OF CURRENT ON POWDER FORMATION 400 g LaNi$_5$; CURRENT: 5A (●), 10A (■), 15A (▲); 20 RPM

EFFECT OF ROTATIONAL SPEED ON POWDER FORMATION 400 g LaNi$_5$; AGITATION: 7 RPM (●), 20 RPM (■), 34 RPM (▲); 10A

5,766,688

PROCESSES INVOLVING METAL HYDRIDES

This application is a continuation of application Ser. No. 08/735274, filed on Oct. 16, 1996, now abandoned, which is a divisional application of Ser. No. 502,504 filed Jul. 14, 1995 which is now U.S Pat. No. 5,630,933 issued on May 20, 1997.

BACKGROUND OF THE INVENTION

1. Field of the Invention

This invention relates to metal hydrides, and in particular, to processes involving such hydrides.

2. Art Background

Metal hydrides are used in a variety of industrial applications. Although there are many such applications, possibly the most prominent is the use of metal hydrides in batteries. For example, secondary nickel-metal hydride batteries employ lanthanum nickel hydride (or alloy modifications) or other intermetallic hydrides in the negative electrode. A variety of other uses involving energy storage and transfer have been described. Irrespective of the application, a crucial step in preparation is activation of the intermetallic. Activation is achieved, for example, by repeatedly reducing the metal such as $LaNi_5$ to the corresponding hydride with $H_2$ gas at high pressure and/or temperature followed by removal of hydrogen at lower pressures.

This cyclic process, generally denominated activation, is believed to serve a number of purposes. Each reduction to the hydride 1) removes reducible surface oxides which tend to interfere with the functioning of the material in the ultimate desired application, 2) induces a reduction in particle size resulting from an increase in volume that causes fracture of the metal particles, and 3) changes the structure and/or composition of the material and/or surface of the metal. Any one or a combination of these three effects is generally employable to increase the rate of reversible hydrogen reaction and, thus, enhance the operation of the material for applications such as batteries or hydrogen storage.

Methods of activation include 1) hydriding with hydrogen gas at high temperatures and pressure; 2) hydriding with chemical hydriding agents; 3) etching with hot hydrofluoric acid or KOH; 4) pulsing the material between hydriding and dehydriding potentials in electrochemical cells; and 5) conventional battery cycling of metal hydride electrodes. However, activation of hydrides has most widely been performed by the first process, i.e., activation, at relatively high pressures (up to 1000 psi) and temperatures as high as 450° C., by subjecting the metal directly to hydrogen gas. Clearly, although such conditions are not prohibitive to commercial use, they require relatively large expenditures for suitable equipment. Thus, an alternative to high pressure reaction of hydrogen gas with the corresponding metal would be quite desirable.

Additionally, metal hydrides, as they are used in batteries such as nickel/metal hydride batteries, have been observed to undergo serious corrosion. (See T. Sakai et al., *Journal of the Electrochemical Society*, 134, p. 558 (1987).) This corrosion substantially reduces the lifetime of such batteries. It has been reported (see T. Sakai supra), that plating the metal hydride with a metal such as copper, allows the hydride to function as an electrode within the battery and yet prevents or substantially reduces the objectionable corrosion. A metal coating also acts as an oxygen barrier protecting the hydride alloy surface from oxidation and as a microcurrent collector for the charge transfer reaction occurring on the surface. Additionally, a metal coating aids in heat removal, improves electrical conduction, and improves the mechanical stability of the electrode. However, consistently producing a uniform coating of metal on the hydride is difficult to accomplish. Therefore, a highly activated metal hydride uniformly plated with a metal such as copper would be quite desirable.

SUMMARY OF THE INVENTION

Activated metal hydrides having a substantial level of absorbed hydrogen are employed in an extremely advantageous manner. (Metal in this context includes elemental metals, alloys based on elemental metals with the presence of other constituents being acceptable, and intermetallic compounds.) In particular, if the metal hydrides are contacted with an aqueous solution containing metal ions and/or their metallic complexes, plating occurs through interaction of the metal complexes or ions in solution with the absorbed hydrogen. In contrast to standard electroless plating, this process provides a more uniform coating and hence a better protective layer. With the conventional plating, such as electroless plating, the metal complex and the reducing agent are brought together at the surface. In areas where the reducing agent is not accessible, the plating does not proceed. Using the absorbed hydrogen as the reducing agent, it is only necessary to bring the metal complex to the surface. Not only all the alloy surface is plated but the electroless plating with hydrogen produces a uniform coating since the supply of the hydrogen is self regulating. That is, as hydrogen diffuses from the metal hydride through the coating, the diffusion rate is faster on surface defects and thinner coating areas. The higher supply of hydrogen results in higher plating rate and, thus, substantially evens coating thickness variations.

An advantageous method of producing hydrides with absorbed hydrogen is through the activation of metals, e.g., intermetallics such as $LaNi_5$, using an electrochemical technique. In this technique, a metal to be activated is positioned at the cathode of an electrochemical cell such as shown at 9 in FIG. 1. An aqueous-based electrolyte is employed so that upon passing a current at a suitable voltage between cathodes and anodes through the electrolyte, electrolysis of the water present produces hydrogen. The resulting hydrogen interacts with the metal producing the hydride, and additionally, causes fracture of the metal into significantly smaller particles. If the cathode 5 in FIG. 1 is surrounded by a cage 8 of suitable mesh, this fracture continues until the particles are sufficiently small to fall through the mesh into the underlying anode compartment. Excessive hydrogen can be oxidized to reduce the hydrogen content of the hydride powder.

DETAILED DESCRIPTION OF THE DRAWINGS

Metals capable of forming stable metal hydrides are converted into their corresponding hydride, are activated, and are reduced to relatively small particles through an electrochemical process that, in one embodiment, produces an advantageous level of absorbed hydrogen. Typical metals including elements, alloys, and intermetallic materials are employable in such electrochemical processes. Examples of such metals include Pd, LaNi$_5$, MmNi$_{3.5}$Al$_{0.8}$Co$_{0.7}$ (Mm, mischmetal is a mixture or alloy of rare earth metals as described in *Metals Handbook*, 8th ed., ASM, pg. 25, 1961), Ti$_2$Ni, Zr$_{0.5}$Ti$_{0.5}$V$_{0.69}$Ni$_{1.22}$Cr$_{0.22}$, and ZrCrNi. Basically, for the inventive procedure, a metal should be capable of forming a hydride and should have the properties of absorbing hydrogen (more than 0.05% by wt.) inside the metal matrix. A particularly advantageous subset of such materials include metals corresponding to hydrides that produce an electromotive force when employed in a metal hydride battery.

Figure 1:
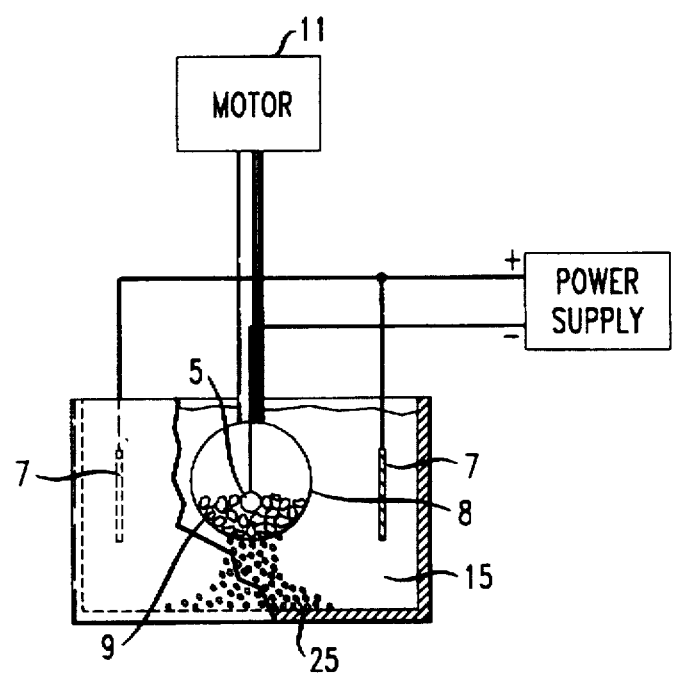
FIG. 1 is illustrative of equipment useful in one aspect of the invention.

The hydrides are formed by reaction with hydrogen generated by electrolysis of an aqueous-based electrolyte, 15 in FIG. 1. For example, a useful electrolyte is formed by dissolving a suitable salt in water. Typical salts employed for such formation of electrolyte include potassium hydroxide and sodium hydroxide. Generally, salt concentrations in the range 0.5% to 50% by weight are employed. Concentrations greater than 50% are undesirable because of salt precipitation, while concentrations less than 0.5% lead to insufficient conductivity. Although the electrolytes should be aqueous based, presence of nonaqueous materials such as ethanol is not precluded. However, generally, concentrations of such nonaqueous materials should be limited to less than 10 volume %.

As previously discussed, the current is passed through the electrolyte, 15, to induce electrolysis of water. Generally, a voltage of 1.23 volt or greater is required to induce such electrolysis. For typical metal compounds, voltages in the range 2 volt to 20 volt are useful. The rate of generation of hydrogen depends on the current. Typically, for a 2.5" inside dia and 4" long cylindrical barrel with a 200 micron size mesh screen wall, currents in the range 5 A to 15 A are usefully employed. Currents below 0.1 A, although not precluded, unduly prolong the process, while currents greater than 20 A induce excessive hydrogen evolution. For such exemplary conditions, typical metal loads are in the range 100 to 500 gms.

The resulting hydrogen interacts with the metal 9 and induces activation of the corresponding hydride including fracture of the metal hydride into smaller particles. It is advantageous to have the cylinder 8 in FIG. 1 be made of mesh so that this fracture process continues until a desired particle size is reached resulting in particles, 25, falling through the mesh (which advantageously is rotated by motor, 11) and out of the reaction region. Particle fracture does not continue indefinitely once the particle falls through the barrel, and typically, mean fracture size is limited to a range between 6 μm and 200 μm. Such particle size is nevertheless advantageous for most uses including for applications in batteries.

The composition of the electrodes is not critical. Typically, electrodes such as nickel and stainless steel are employed where the geometry of the anode, 7, is typically a mesh type and the cathode, 5, is a spherical dangler. Additionally, the size of the cell is also not critical, and typically, configurations such as a cylindrical barrel are employed.

In the case where the metal hydride does not need to be coated by plating or where absorbed hydrogen is not used for such plating, the activated metal hydride is allowed after it passes through the mesh to contact an anode, any excess, absorbed hydrogen present is oxidized to form water. In this manner, any excessive accumulation of hydrogen is avoided, and thus, the activated material can be handled in air.

The activated hydride particles from the inventive electrochemical process have a substantial level of absorbed hydrogen. The level of hydrogen in some exemplary metals is shown in Table 1.

TABLE 1

Hydrogen Storage Capacities of Metal Hydrides

| Metal Hydride | Hydrogen Density (H/mL × 10$^{-22}$) | Capacity (mAh/g) |
|---|---|---|
| LaNi$_5$H$_6$ | 7.4 | 372 |
| CaNi$_5$H$_6$ | 6.6 | 480 |
| FeTiH$_2$ | 5.6 | 490 |
| Mg$_2$NiH$_4$ | 5.9 | 990 |
| H$_2$ liquid | 4.2 | |

The concentration of hydrogen in liquid hydrogen is given as a comparison. As can be seen, the concentration of hydrogen in the activated metal hydrides is relatively high. This hydrogen is advantageously used as a reducing agent for the plating, such as electroless plating, of the metal hydrides. (However, as to this aspect of the invention, the method of producing particles with absorbed hydrogen for subsequent plating is not critical. Clearly, the previously defined activation process is useful alone or in combination with a plating process for providing absorbed hydrogen. Additionally, the use of absorbed hydrogen for plating is useful irrespective of the method used to produce such absorption.) Such plating is advantageous to prevent, for example, corrosion of the hydrides when employed in batteries. The composition of the plating solution is not critical. Typical plating solutions are alkaline solutions containing metal complexes. (A complex in this context is, for example, ethylenediaminetetraacetate (EDTA) for copper plating.) Exemplary materials for plating include copper, nickel, cobalt, silver, palladium and their alloy. However, it is advantageous that these electroless plating solutions be employed in the substantial absence of a reducing agent other than the hydrogen present. By this expedient, a quite uniform plating of metal onto the metal hydride is accomplished. However, if a thicker metal layer is required, the standard electroless plating solutions are useful. (A substantial presence of reducing agent is a concentration above 0.1 wt. %.) In practice, the activated metal hydrides are plated by simply immersing such hydrides in the plating solution. Generally, such plating is self terminating, and typically, obtained thicknesses are in the range 0.1 to 5 μm and are achieved during time periods in the range 1 to 60 mins.

The described hydrogen electroless plating process allows the possibility of developing a close loop process. The by-product of the plating is only H$^+$ions, which makes it possible to replenish the solution by adding a source of metal ions such as metal oxide. In the case of plating copper on metal hydride alloys using hydrogen as the reducing agent, the complete reaction is:

$$CuO + 2MH = Cu_p + 2M + H_2O$$

where M is the metal, alloy or intermetallic compound, MH is the metal hydride, and Cu$_p$ is the Cu plated on the metal.

The following examples are illustrative of the invention.

EXAMPLE 1

About 400 grams of chunks of LaNi$_5$ (1–3 cm size) were placed into a barrel plater (Model 24, Stirling Systems Sales Corp., St. Charles, Ill.). The barrel had a 200 micron size mesh made of polypropylene materials. The propylene tank (8"×8"×8") contained about 7 liters of 30 wt. % KOH aqueous solution. There were two vertical nickel anodes (3"×4") placed about 0.25" away from the barrel. The cathodic current was passed through the chunks of LaNi$_5$ by using a spherical dangler inside the barrel. The rotational speed was set to about 5 rpm. The current was set at 10 amperes and the cell voltage was about 7 volts. After 8.5 hours, 82 grams of LaNi$_5$ were reduced to sizes below 200 μm and fell through the barrel to the bottom of the tank. During the next 10 hours, additional 110 grams of LaNi$_5$ fell through the barrel.

The LaNi$_5$ powder was separated from the KOH solution and placed into a copper solution (0.016M CuSO$_4$, 0.032M ethylenediaminetetraacetic acid) for 15 minutes. The solution pH remained unchanged at 12.7. The temperature was held in the range of 52° to 62° C. The powder was coated with copper. The copper content was estimated to be 4.5 wt. %.

Figure 2:
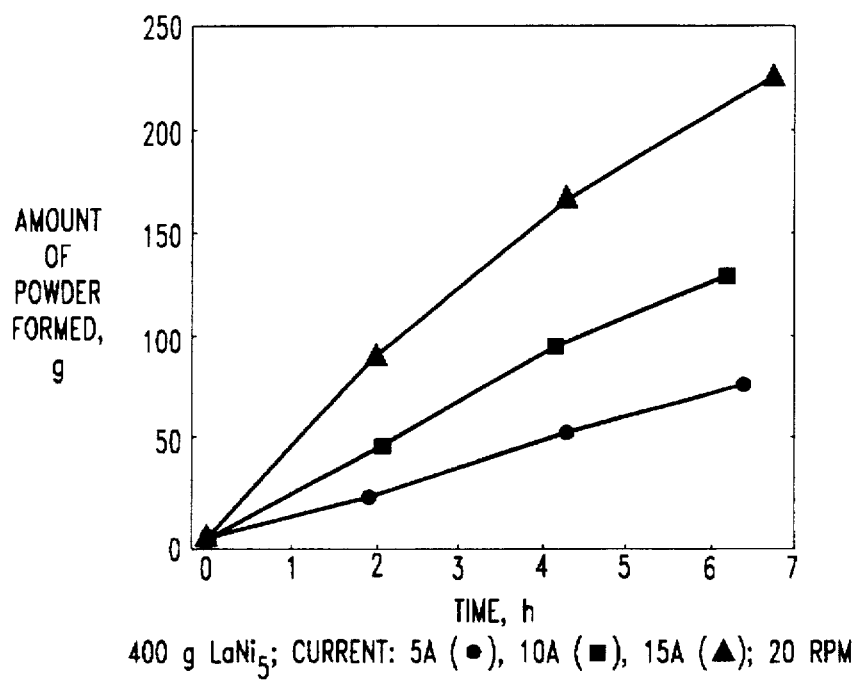
FIGS. 2 and 3 are illustrative of results relating to the invention.
Figure 3:
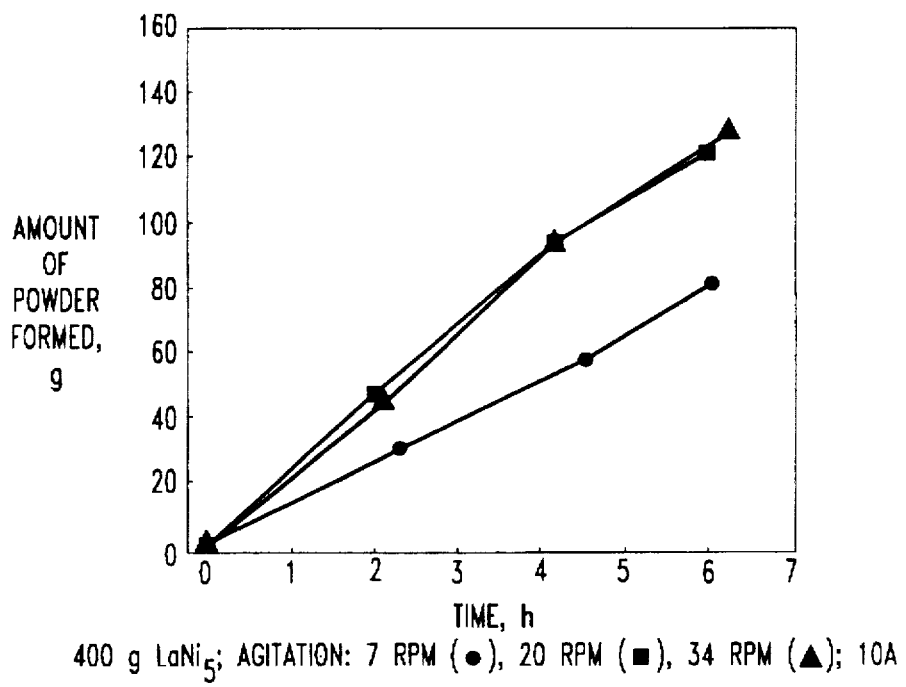

Additional experiments were carried out to determine the dependence of powder formation on the electrolytic current passed and the rotational speed of the plating barrel. FIG. 2 shows the amount of powder formed as a function of the current passed. The rate of powder formation was higher at higher current: 12.5 g/hr, 21 g/hr, and 35 g/hr at 5A, 10A, and 15A respectively with a rotational speed of 20 rpm. FIG. 3 shows the amount of powder formed as a function of the rotational speed of the plating barrel while passing a current of 10 amperes. At 20 rpm or higher, the rate of powder formation was about 20 g/hr. At 7 rpm, the rate dropped to 13 g/hr.

EXAMPLE 2

Pd wires (1 mm diameter) were charged with hydrogen by electrolysis in 1 M KOH for about 18 hours at a current density of approximately 20 mA/cm$^2$. After a quick rinse in de-ionized water, the Pd hydride wires were immersed for about 15 min. into the plating solution held at 50° C. The thickness of the metal coating was measured by X-ray fluorescence and cross-section microscopy. The plating solutions used and the thickness of the metal coating are listed in Table 2.

TABLE 2

| Metal Hydride | Plated Metal | Plating Solution | Average Thickness (microns) |
|---|---|---|---|
| PdH$_x$ | Cu | 0.1M CuSO$_4$, 0.05M H$_2$SO$_4$ | 2.0 |
| PdH$_x$ | Cu | 0.02M CuSO$_4$, 0.065M triisopropanolamine | 0.5 |
| PdH$_x$ | Ag | 0.01M AgCN, 0.1 MKCN, 0.1M KOH | 3.6 |
| Pd(no H$_2$) | Ag | 0.01M AgCN, 0.1 MKCN, 0.1M KOH | 0.1 |

Copper is plated in both acidic and basic solutions. The copper coating plated in the acidic solution is thicker than the basic solution, possibly due to the higher throwing power in the lower pH. About 3.6 microns of Ag was plated on the hydrided Pd wire in the silver cyanide solution. Since it is possible to plate Ag on Pd by displacement plating, a Pd wire with no hydrogen charging was placed in the same solution and the Ag plated by displacement was found to be negligible.

EXAMPLE 3

Nickel and Cu were plated on representative intermetallic alloys that can be hydrided, such as LaNi$_5$, Ti$_2$Ni, Ti$_2$Ni$_{0.8}$Mn$_{0.2}$ and ZrCrNi. A 1 gram ingot of LaNi$_5$ was converted to hydride in 1 M KOH for approximately 4 hours at a current density of 20mA/cm$^2$. After a quick rinse in de-ionized water it was immersed in an alkaline ammoniacal solution (0.2M NiSO$_4$, approximately 1.2M NH$_4$OH to pH 12) at room temperature for 15 min. Another LaNi$_5$ sample plus ingots of Ti$_2$Ni and Ti$_2$Ni$_{0.8}$Mn$_{0.2}$ were charged and washed as described above and then immersed for 15 min. in an alkaline copper plating solution (0.02M CuSO$_4$, 0.065M triisopropanolamine, 0.2M NaOH, pH 12) at 50° C. A ZrCrNi sample was treated in a similar fashion but no Cu plating was realized. The sample was pulse activated prior to immersion in the Cu plating solution and a coating of about 2.5 microns was obtained. The average thickness of all the coatings is listed in Table 3.

TABLE 3

| Metal Hydride | Plated Metal | Average Thickness (microns) |
|---|---|---|
| LaNi$_5$ | Ni | 0.5 |
| LaNi$_5$ | Cu | 3.0 |
| Ti$_2$Ni | Cu | 3.0 |
| Ti$_2$Ni$_{0.8}$Mn$_{0.2}$ | Cu | 2.0 |
| ZrCrNi | Cu | 2.5 |

The invention claimed is:

1. A process for producing a continuous plated layer on a hydrided metal material comprising the steps of bringing said hydrided metal material in contact with a solution containing entities to be plated wherein said hydrided metal material has sufficient absorbed hydrogen in the absence of additional reducing agent to form, by electroless plating, said continuous plated layer by reducing the entities to be plated.

2. The process of claim 1 wherein said metallic material comprises a material chosen from the group consisting of Pd, LaNi$_5$, MmNi$_{3.5}$Al$_{0.8}$Co$_{0.7}$, Ti$_2$Ni, Zr$_{0.5}$Ti$_{0.5}$V$_{0.69}$Ni$_{1.22}$Cr$_{0.22}$, and ZrCrNi.

3. The process of claim 1 wherein said metallic material comprises a metal chosen from the group consisting of Pd, LaNi$_5$, MmNi$_{3.5}$Al$_{0.8}$Co$_{0.7}$, Ti$_2$Ni, Zr$_{0.5}$Ti$_{0.5}$V$_{0.69}$Ni$_{1.22}$Cr$_{0.22}$, and ZrCrNi.

4. The process of claim 1 wherein said absorbed hydrogen constitutes at least 0.05 wt. % of said metallic material.

5. The process of claim 1 wherein said plated layer comprises copper, nickel, cobalt, silver, palladium, or their alloys.

* * * * *